Figure 1:
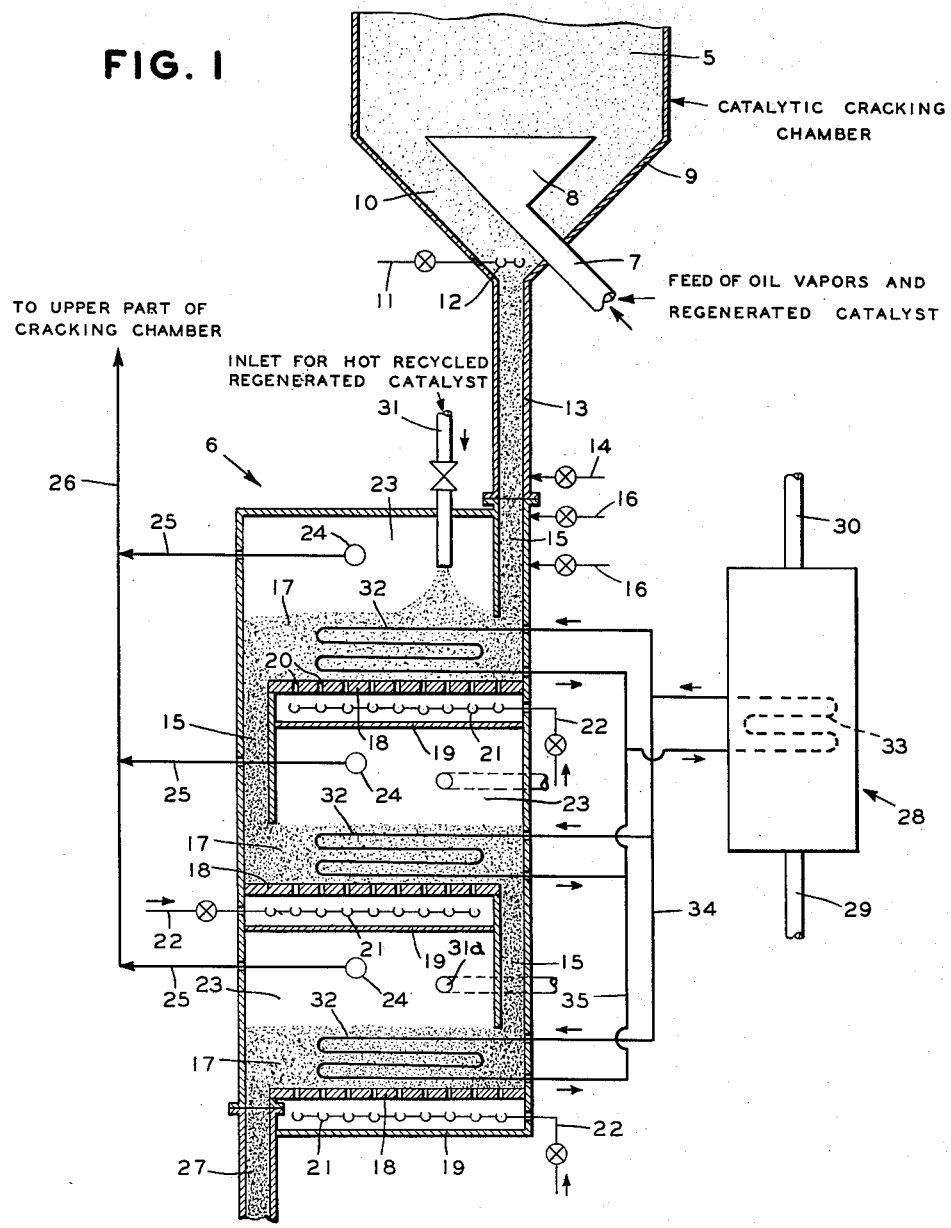

March 18, 1952     W. H. BORCHERDING     2,589,984
CATALYST STRIPPING OF FOULED CATALYSTS EMPLOYED
IN HYDROCARBON CONVERSION PROCESSES
Filed July 1, 1947     2 SHEETS—SHEET 1

INVENTOR
WALTER H. BORCHERDING
BY E. J. Liebrecht
William Klabunde
ATTORNEYS

March 18, 1952 W. H. BORCHERDING 2,589,984
CATALYST STRIPPING OF FOULED CATALYSTS EMPLOYED
IN HYDROCARBON CONVERSION PROCESSES
Filed July 1, 1947 2 SHEETS—SHEET 2

INVENTOR
WALTER H. BORCHERDING
BY E. F. Liebrecht
William Klabunde
ATTORNEYS

Patented Mar. 18, 1952

2,589,984

UNITED STATES PATENT OFFICE 2,589,984

CATALYST STRIPPING OF FOULED CATALYSTS EMPLOYED IN HYDROCARBON CONVERSION PROCESSES

Walter H. Borcherding, San Francisco, Calif., assignor to The M. W. Kellogg Company, Jersey City, N. J., a corporation of Delaware Application July 1, 1947, Serial No. 758,381

4 Claims. (Cl. 196—52)

This invention relates to a process for the catalytic conversion of hydrocarbons, and particularly to improvements in processes of the type represented by the well-known "fluid catalytic-cracking" procedure. This application is a continuation-in-part of my co-pending application Serial No. 537,937, filed May 29, 1944, now Patent No. 2,490,933 issued December 13, 1949.

In the well known fluid catalytic cracking operation, finely divided or powdered particles of catalytic material are continuously circulated between conversion and regeneration contact zones. In the conversion zone, the particles of catalyst are contacted with the oil vapors undergoing cracking at elevated temperatures and for a period of time sufficient to bring about the desired catalytic conversion. Such conversion reaction produces a deposit of carbonaceous material, or coke, on the catalyst. Upon separation and withdrawal from the vapors undergoing conversion, the spent catalyst is passed to a regeneration zone wherein it is contacted with an oxygen-containing gas under conditions suitable to remove the carbonaceous deposit by combustion, without detrimentally affecting the catalytic activity of the catalyst particles.

During transfer between the conversion zone and the regeneration zone, it is customary to subject the spent catalyst to a purging treatment with an inert gas, such as steam, to dissociate adsorbed and entrained vapors from the catalyst and to reduce the quantity of carbonaceous material present on the catalyst particles upon introduction to the regeneration zone.

It is a principal object of the present invention to provide improvements in the mode of operation and the efficiency of the purging treatment of spent catalyst withdrawn from the reaction zone in preparation for its introduction to the regeneration zone.

In my aforementioned co-pending application, Serial No. 537,937, now Patent No. 2,490,933, I have disclosed a procedure for the catalytic conversion of hydrocarbons which is a departure from conventional practices, as represented, for example, by the process described in the Belchetz Patent No. 2,253,486. Conventional procedure usually involved simple counter-current flow of the used catalyst and the purging gas by permitting the used catalyst particles to fall through a vertical purging column in contact with an upwardly flowing stream of the purging medium, so that the used catalyst particles during their flow downwardly through the column are contacted with a stream of purging gas of constantly increasing purity from the standpoint of the concentration of purgeable material therein. In accordance with a preferred embodiment of the process of my co-pending application, the catalyst particles, while substantially at the elevated temperature to which they have been heated in the conversion step, are flowed as a fluid mass in a generally horizontal direction at a plurality of successively lower horizontal levels constituting a stripping zone. The spent catalyst particles are withdrawn from the conversion zone by gravity flow through a transfer line and are introduced to the uppermost level of the stripping zone wherein, by reason of a considerable increase in cross-section flow area, the velocity of the stream of catalyst particles is substantially reduced. Transfer of the fluid mass of catalyst particles downward between the successive levels of the stripping zone is affected by gravity flow. At each of the successive horizontal levels a purging medium is passed upwardly through the flowing mass of catalyst particles in quantity sufficient to maintain the fluid flowable condition of the mass and to purge the catalyst particles of vaporizable carbonaceous material entrained from the conversion zone and, in addition, similar material evolved during the prolonged period of flow of the hot catalyst through said plurality of horizontal levels.

In passing through the stripping zone, the spent catalyst which normally is withdrawn from the reaction zone at temperatures within the range of about 850° to 950° F. tends to continue cracking, thus converting some of the adsorbed and entrained hydrocarbons into lighter components which, when purged from the catalyst by the stream of purging gas are carried by the latter out of the stripper and subsequently combined with the gaseous conversion products of the reaction zone. The amount of additional cracking occurring within the stripper varies with the catalyst residence time within the stripper, so that, for most efficient recovery of the light hydrocarbon products, prolonged residence time is beneficial. It has been noted, however, that the introduction of steam as a purging medium into the catalyst mass passing through the stripper serves to increase slightly the temperature within the stripper by reason of the fact that the steam gives up its latent heat. The consequent temperature rise, however slight, provides more efficient stripping, since it acts to rapidly clean-up more of the heavier hydrocarbon components in the catalyst bed.

In accordance with the present invention, it is proposed to concurrently obtain the advantages of both prolonged residence time and increased temperature within the stripper in order to obtain a maximum stripping efficiency. Prolonged residence time is obtained with the stripper by reason of the internal tray construction which permits the catalyst to be passed back and forth across the tower as it moves progressively downward. The increased temperature within the stripper necessary to provide the desired clean-up of entrained and adsorbed hydrocarbon is suitably provided by utilizing some of the heat from the regeneration zone in which the spent catalyst leaving the stripper is revivified by burning off the carbonaceous deposit of the catalyst particles.

As disclosed in my aforementioned co-pending application, heat from the regeneration zone may be transmitted to the catalyst bed within the stripper by providing a circulatory system employing a fluid heat exchange medium in which the latter is in indirect heat exchange with both the catalyst undergoing regeneration and the catalyst being stripped. In a preferred modification, however, it is proposed to transmit heat from the regeneration zone to the stripping zone by passing a controlled stream of hot regenerated catalyst from the regenerator into the moving bed of catalyst within the stripper. The admixing of the hot fresh catalyst withdrawn from the regenerator at a temperature of about 1050° F. with the spent catalyst withdrawn from the reactor at a temperature of about 950° F. or lower provides a substantially instantaneous increase in the temperature of the spent catalyst particles, so that immediate and rapid cracking of the adsorbed carbonaceous material occurs.

A further object of this invention is to provide a method for efficiently stripping hydrocarbons from spent catalyst within a stripping zone adapted to provide a suitable combination of prolonged residence time and increased temperature.

In utilizing a stream of hot regenerated catalyst as the heating medium in direct admixture with the spent catalyst passing through the stripping zone, it is obvious that some sacrifice in residence time of the spent catalyst particles within the stripper is unavoidable. Since the amount of catalyst which may be held up within the stripping zone is relatively fixed by the physical characteristics of the stripper, the dilution of the spent catalyst stream with fresh regenerated catalyst particles causes each particle of spent catalyst to pass more rapidly through the stripping zone, thus limiting the residence time available for additional cracking. It is clear, therefore, that for maximum stripping efficiency the feed rate of the recycle stream of fresh regenerated catalyst and the stripper design should be so correlated as to avoid having one advantage off-set the other.

It is therefore a further object of this invention to provide a method for both prolonging the residence time of spent catalyst passing through a stripping zone and increasing the temperature of the spent catalyst mass at one or more suitable points therein to promote a maximum of stripping action and carbon decomposition.

Figure 2:
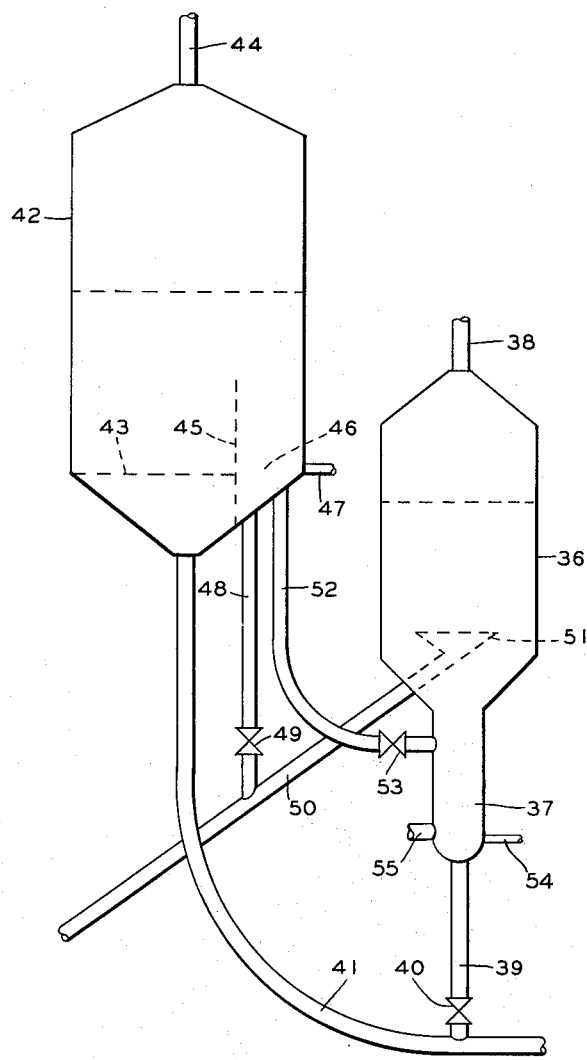

These and other objects are effected by this invention as will be apparent from the following description and claims taken in connection with the accompanying drawing forming a part of this application in which:

Fig. 1 is a diagrammatic view in vertical sectional elevation showing a suitable form of apparatus for carrying out the invention; and Fig. 2 is a diagrammatic view in elevation showing a typical application of the novel method to a conventional arrangement of apparatus in a fluid catalytic cracking system.

Referring to the drawings, the numeral 5 indicates a conversion chamber for the catalytic cracking of hydrocarbons in a fluid catalytic cracking system in association with a stripping tower, generally indicated by the numeral 6, for effecting the purging operation pursuant to this invention.

The cracking chamber 5 illustrated in the drawing is of the type in which the powdered catalyst is both supplied to and withdrawn from the lower portion of the cracking chamber. Although this type of chamber is regarded as being preferable, it is to be understood that the process is applicable also to those fluid catalytic conversion systems wherein both the powdered catalyst and the reaction vapors are withdrawn overhead from the conversion chamber.

In the type illustrated, a suspension of hydrocarbon vapors which are to undergo cracking treatment and fresh or regenerated powdered catalyst is supplied through a transfer line 7 to a suitable discharging means, such as the conical distributor 8 disposed concentrically within the conical base portion 9 of the cracking chamber 5. The hydrocarbon vapors and the powdered catalyst are supplied in such quantities and in such proportion as to produce a relatively dense turbulent fluidized phase of catalyst particles within the cracking chamber 5. The hydrocarbon vapors discharging from the distributor 8 pass upwardly through the dense catalyst phase, and during their contact with the catalyst undergo the desired conversion reaction. By reason of the extensive turbulence and internal recycle of the catalyst particles produced within the dense phase of the catalyst bed, the catalyst mass is in a substantially uniform fluidized condition throughout, and catalyst may readily be withdrawn from any point therein by gravity flow, even from a point in the lower portion of the chamber 5 closely adjacent the incoming stream of hydrocarbon vapors and regenerated catalyst. As illustrated, the catalyst is withdrawn from the chamber 5 through the annular passage 10, between the conical distributor 8 and the conical base 9 of the chamber. The catalyst is maintained in its fluidized condition while flowing through the passage 10 by means of a suitable aerating medium introduced at a low point in the passage 10 through valved line 11 and the distributor 12.

The spent catalyst is withdrawn from the base of the chamber 5 through a suitable standpipe 13 in open communication with the passage 10. In passing downwardly through the standpipe 13, the catalyst is maintained in its fluidized state. If necessary, aerating fluid may be supplied for this purpose through valved line 14, which introduces the aerating medium at a low point in the standpipe.

The introduction of aerating fluid at the points indicated by the valved lines 11 and 14 serves to purge the spent catalyst as well as to aerate it, by reason of the counter-current flow of the aerating medium with respect to the downwardly flowing column of catalyst.

From the lower end of the vertical standpipe 13 the catalyst discharges into the uppermost one of a series of vertical downflow pipes 15, which in effect forms an extension to the standpipe and delivers spent catalyst to the top horizontal level of the stripping tower 6. In its passage by gravity flow through the extended lower portion 15 of the standpipe, additional aerating and purging fluid may be introduced, as through valved lines 16, to maintain the desired free flowing condition. It is contemplated, however, that in certain instances the desired free flowing condition in the downflow pipes may be obtained without the provision of separate aerating means at these points. The remaining downflow pipes 15 are alternately disposed on opposite sides of the stripping tower, and provide communicating means for delivering the catalyst from one level to the below adjacent level.

At each of the horizontal levels the discharge of powdered catalyst from the lower end of downflow pipe 15 displaces a corresponding amount of the catalyst present in the horizontal bed 17, which is supported on a perforated partition 18. Below and spaced from the perforated partitions 18 are solid horizontal partitions 19 which extend across the stripping tower to the outer perimeter of the downflow pipes 15 and divide the stripping tower into sealed compartments having communication solely through the downflow pipes 15. Between each perforated partition 18 and its associated solid partition 19 suitable means is provided for injecting a controlled quantity of a purging fluid, such as steam, which may be heated to an elevated temperature, into the flowing catalyst bed through the perforations 20 in the partition 18. The steam, for example, may be supplied at temperatures in the range of 850° to 950° F., the temperature at which the spent catalyst is withdrawn from the reactor. The purging fluid is introduced through a distributing means 21, diagrammatically illustrated in the drawing, connected to a valved supply line 22. The purging fluid is supplied in quantity at least sufficient to maintain the catalyst above the perforated partition 18 in a free flowing condition, so that the desired purging of the carbonaceous contaminants may readily be effected. The gaseous mixture of purging medium and purged material is withdrawn from the space 23 above each horizontally moving catalyst bed 17 through an outlet 24 in the side of the stripping tower. Conduits 25 connect each of the outlets 18 at the separate levels to an outlet manifold 26. After passing over the horizontal perforated partition 18 at the first or uppermost level, the partially purged catalyst passes downwardly by gravity flow through the downflow pipe 15 to the second level, where it is subjected to a similar purging treatment. From the second level the catalyst is then passed downwardly through one or more additional stages wherein the treatment and the structural elements for carrying it out are similar. The purged product gases from the stripping tower 6 are passed through outlets 24, conduits 25 and the manifold line 26 into the upper part of the cracking chamber 5, preferably into the light dispersed phase of the catalyst at the top of the chamber, whereby the purged gaseous products and catalyst incidentally suspended in the purging medium are admixed with the gaseous reaction products and entrained catalyst and are subsequently recovered. Within the stripping tower the number of stages of horizontal flow may be varied in accordance with the particular circumstances, a sufficient number being provided, however, to effect the desired degree of purging within economical limits.

From the purging treatment in the lowermost level of the stripping zone the purged catalyst is continuously withdrawn through the downflow pipe 27 and is passed to the regeneration zone, shown in diagrammatic form and generally indicated by the numeral 28, through an extended transfer line, not shown. The purged catalyst is admitted to the regeneration zone by means of a conduit 29 extending upwardly into the bottom thereof. Within the regeneration zone 28 the purged spent catalyst while in a fluidized condition is contacted with a stream of oxygen-containing gas, in order to remove by combustion the carbonaceous deposit on the catalyst particles. After a residence time within the regeneration zone sufficient to complete the desired degree of revivification, the catalyst is withdrawn through outlet 30 and is returned through conduit 7 and distributor 8 to the cracking zone, thus completing a cycle of operation. While the embodiment of Fig. 1 shows the purging medium being passed through the plurality of horizontal levels in a parallel flow arrangement, it is obvious that, in a proper case, the intermediate solid partitions 19 may be omitted and the purging medium, from either a single source provided below the lowermost horizontal perforated partition 18 or from multiple sources 21, as shown, be passed successively upward through all the perforated partitions 18. It is also contemplated that in place of the perforated horizontal partitions 18 for distributing the purging medium, other suitable types of distributing means may be employed, as, for example, porous ceramic plates or trays with bubble caps in a construction similar to that conventionally used in liquid-vapor fractionating towers.

In passing from the standpipe formed by the members 13 and 15 into the chamber 23 above the uppermost horizontal perforated plate 18, the velocity of the catalyst stream is materially reduced by reason of the substantial increase in cross-section flow area provided in the catalyst bed 17 moving horizontally across the plate 20. By maintaining within the moving bed of catalyst a temperature higher than, or at least as high as the reaction zone temperature, it is possible to prolong the cracking reaction of incompletely reacted hydrocarbons carried out of the reactor with the spent catalyst. A substantial portion of the hydrocarbons within the spent catalyst bed, however, are present in the form of adsorbed hydrocarbons, which comprise a thin film or deposit of heavier hydrocarbons having distillation points above the reaction zone temperatures. To obtain a maximum recovery of desired hydrocarbon components, additional heat may be supplied to the stripping zone to distill off some of the adsorbed heavier hydrocarbons which, when vaporized, may readily be purged with the entrained lighter components by the stripping medium. The additional heat may be introduced into the spent catalyst stream at one or more points along its course through the series of horizontal levels. Preferably, additional heat is supplied in a degree and amount sufficient to raise the temperature of the spent catalyst quickly, so that a rapid clean-up of the more readily purgeable components of the adsorbed material may be obtained. Rapid-heating zones may be provided at each of the levels, or at one or more, as desired. In certain cases it may be found most desirable to provide the rapid-heating zone for the spent catalyst on the bottom level of the stripper, so that the rapid clean-up of hydrocarbons may be obtained just prior to the withdrawal of the catalyst from the stripper for passage to the regenerator feed line. It is thus possible to recover a substantial portion of the hydrocarbons which normally would be carried over into the regenerator and be lost through combustion during the regeneration treatment.

Pursuant to a preferred embodiment of the present invention, additional heat is supplied to the spent catalyst during the stripping period by recycling a stream of hot regenerated catalyst from the regeneration zone 28 to the moving catalyst bed 17. As shown in the diagrammatic illustration of Fig. 1, the stream of hot regenerated catalyst may be withdrawn from the regenerator 28 through line 30, and after passing through an extended transfer line, not shown, be introduced at the top of the stripping tower 6 into the space 23 above the moving catalyst bed 17 on the uppermost horizontal level through the valved inlet conduit 31. Such arrangement provides a substantially instantaneous admixing of fresh regenerated catalyst with the stream of spent catalyst discharging from the standpipe 15, so that there is obtained a direct and immediate heat exchange between the catalyst streams in a degree not readily obtainable with other heating means. Preferably, only as much fresh regenerated catalyst is admitted through inlet 31 as will be necessary to satisfy the additional heat requirements, since dilution of the spent catalyst stream with fresh catalyst increases the rate of flow of the spent catalyst particles through the stripper. For most efficient results it is obvious that a careful balance must be preserved between catalyst dilution and prolongation of residence time. Alternative to the foregoing arrangement, the hot regenerated catalyst may be introduced to the stripping zone through an inlet 31a placed above the catalyst bed on the lowermost horizontal level. With the latter arrangement, the spent catalyst discharging from the standpipe 15 may be caused to pass through substantially the entire length of the stripping zone at a slow rate determined by the design of the stripper, and may receive an injection of fresh regenerated catalyst for a final quick clean-up of hydrocarbons just prior to its discharge through the outlet 27. It is contemplated that similar inlets for the hot regenerated catalyst may also be provided for any or all intermediate levels of the stripper and that catalyst may be supplied at separately controlled rates through any combination of inlets. After passing through the various levels of the stripping zone, the mixture of stripped spent catalyst and regenerated catalyst is drawn off through outlet 27 and is passed into a carrier line, not shown, for conveyance to the regenerator 28.

As an alternative method for supplying additional heat at any of the various levels of the stripping tower, a heating coil 32 may be disposed within the catalyst bed at each of the levels. The stripping tower heating coils 32 are connected to a heating coil 33 disposed within the dense bed of the regenerator. Supply and return lines 34 and 35, respectively, connected in a parallel flow arrangement, provide a continuous flow path between the stripper heating coils 32 and the regenerator coil 33, through which a suitable fluid heat exchange medium, such as molten salt, may be circulated in indirect heat exchange within both the stripping and the regeneration zones with the mass of catalyst particles. The indirect heating provided by the coil system just described may be used as an alternative to the direct heat exchange system provided by recirculating hot regenerated catalyst, or it may be used to supplement the latter form of heating.

Referring now to Fig. 2, the method of the present invention is shown embodied in a conventional arrangement of apparatus in a fluid catalytic cracking system. A reactor vessel 36 is provided at its lower end with an integral stripping well 37 of substantially less diameter than the reactor. Fresh catalyst in admixture with a stream of hydrocarbon vapors is supplied to the reactor 36 through the reactor feed line 50. The catalyst and hydrocarbon mixture is discharged into the reactor through the conventional distributor 51. Within the reactor the catalyst undergoes the usual phase separation. The gaseous products of reaction are passed out of the reactor through the overhead conduit 38, and are subsequently recovered in the usual fractionating apparatus, not shown. After a suitable residence time within the reactor, the catalyst particles which have become spent by reason of the formation of a carbonaceous deposit thereon, are passed downwardly by gravity flow through the stripping section 37, where the spent catalyst undergoes the conventional purging treatment. By the injection of a suitable stripping medium, such as steam, through inlet 54 into the lower portion of the stripper 37 for passage upwardly countercurrent to the downwardly flowing spent catalyst stream, the latter is purged of the entrained and adsorbed hydrocarbons and the purged products are passed upwardly through the dense phase of the reactor and are passed overhead out of the reactor with the gaseous products of reaction.

At the base of the stripping section 37 a vertical standpipe 39 is provided, through which stripped catalyst is withdrawn from the stripping section and passed by gravity flow downwardly through slide vale 40 to the regenerator feed line 41. Within the regenerator feed line 41 the catalyst is picked up by a stream of oxygen-containing gas and is passed upwardly to the regenerator 42. The mixture of stripped spent catalyst and oxygen-containing gas is admitted to the regenerator 42 below a perforated distributor plate 43. Passing upwardly through distributor plate 43 the catalyst enters the regeneration zone wherein it undergoes the usual phase separation. Within the regeneration zone, the carbonaceous deposit on the catalyst particles is removed by combustion with the oxygen-containing gas, and the gaseous products of combustion are withdrawn from the regenerator through the overhead conduit 44. Distributor plate 43 extends partway across the regenerator vessel and intersects a vertical solid partition 45, which divides the lower section of the vessel so as to form an internal stripping well 46 along one side. The dense phase of the catalyst bed extends from the upper surface of the distributor plate 43 to a point substantially above the upper edge of the vertical partition 45, so that catalyst from the dense phase may pass in a continuous stream into the stripping well 46. After a residence time within the regenerator 42 suitable to remove the carbonaceous deposit, and thus revivify the catalyst particles, the regenerated catalyst is passed in a continuous stream downwardly through the stripping well 46 where, in contact with a counter-currently flowing stream of a suitable stripping medium, such as steam, introduced at the base of the stripping well through the line 47, the regenerated catalyst is stripped of the entrained gaseous products of combustion.

From the base of the stripping well 46 in the regenerator 42 regenerated catalyst is withdrawn through a vertical standpipe 48, having a slide valve 49 at its lower end, and is injected into the reactor feed line 50. In the reactor feed line the hot regenerated catalyst is picked up by a preheated hydrocarbon feed stream and passed into the reactor 36.

A second standpipe 52 is connected to the lower end of the stripping well 46 through which a stream of hot regenerated catalyst particles may be withdrawn and passed through a slide valve 53 to the stripper 37 at the base of the reaction vessel 36. Although valved line 52 as shown in the drawing, is connected to the upper portion of the stripper 37 it is contemplated that in certain instances more satisfactory results may be obtained by introducing the fresh regenerated catalyst at a lower point in the stripper, for example, through inlet 55 near the base of the stripper. Or, in a proper case, controlled amount may be simultaneously injected at a plurality of levels within the stripper.

Various advantages are obtained by introduction as herein described of a recycle stream of hot regenerated catalyst into the stripping zone. Primarily the fresh supply of hot catalyst serves as a direct heat exchange medium to quickly raise the temperature of the slowly-moving catalyst bed. The immediate and complete intermixing of the two catalyst streams effects a substantially instantaneous transfer of heat, thus making it possible to obtain a temperature control within the moving bed at all times. It is, therefore, possible to so control the temperature of the slow-moving catalyst bed that additional controlled cracking of the adsorbed and entrained hydrocarbon vapors may occur, with a consequent higher recovery of the desirable hydrocarbons. A further advantage is that by recovering within the stripper a higher percentage of the hydrocarbons carried on the catalyst from the reaction zone, there is available for combustion within the regenerator a diminished supply of fuel in the form of coke. This latter advantage is readily translated into economies in the field by reason of the fact that it permits a substantial reduction in the size of the regenerator, or, alternatively, a higher conversion within the reactor.

It will be apparent to those skilled in the art that various changes and modifications in the process may be made within the spirit of this invention and it is desired, therefore, that only such limitations shall be placed thereon as are set forth in the appended claims.

I claim:
1. In a catalytic conversion process wherein fluidized solids are contacted with hydrocarbon vapors in a conversion zone under conditions for effecting conversion and the accumulation of carbonaceous deposits on said solids, are passed through a stripping zone for the removal of vaporizable hydrocarbon material, are regenerated in a regeneration zone to effect combustion of said carbonaceous deposits thereby increasing the sensible heat contained in said solids and are finally returned to the conversion zone for supplying heat thereto and for effecting further conversion, the improved method of operation which comprises introducing one stream of hot regenerated catalyst from said regeneration zone to said conversion zone, introducing another stream of hot regenerated catalyst directly from said regeneration zone to said stripping zone, intermingling catalyst from said last-named stream with catalyst from the conversion zone in the upper part of said stripping zone, stripping the intermingled catalyst in said stripping zone and returning the intermingled stripped catalyst from the base of the stripping zone to the regeneration zone.

2. The method of claim 1 which includes the step of maintaining the temperature of the regeneration zone at least 100° F. higher than the temperature of the conversion zone.

3. The method of claim 1 which includes the step of passing a stripping gas upwardly through said stripping zone at a sufficiently high velocity to effect turbulence therein whereby the hot regenerated catalyst is intimately mixed with the catalyst from the conversion zone.

4. In a catalytic conversion process which comprises continuously introducing hot regenerated catalyst of small particle size into a conversion zone, passing a gasiform hydrocarbon charging stock stream upwardly through the conversion zone at a velocity for maintaining a dense turbulent catalyst phase superimposed by a light catalyst phase and under conditions for effecting conversion of said charging stock and deactivation of said catalyst, continuously withdrawing deactivated catalyst from the dense phase in the conversion zone, introducing the withdrawn deactivated catalyst into the upper part of a stripping zone, introducing a stream of hot regenerated catalyst from a regeneration zone directly into the upper part of said stripping zone and commingling said hot regenerated catalyst with deactivated catalyst introduced from the conversion zone for supplying additional heat to the deactivated catalyst, passing a stripping gas upwardly through the admixed catalyst material in the stripping zone at a rate sufficient to maintain the catalyst in dense phase condition but insufficient to cause a net upward flow of catalyst in said zone, introducing catalyst from the base of said stripping zone to a regeneration zone, heating the catalyst in the regeneration zone to a temperature higher than the temperature in the conversion zone, returning a part of the regenerated catalyst from the regeneration zone to the conversion zone and returning another part of the regenerated catalyst directly from the regeneration zone to the stripping zone.

WALTER H. BORCHERDING.

REFERENCES CITED

The following references are of record in the file of this patent:

UNITED STATES PATENTS

| Number | Name | Date |
|---|---|---|
| 2,300,151 | Hemminger | Oct. 27, 1942 |
| 2,367,694 | Snuggs | Jan. 23, 1945 |
| 2,389,236 | Payne | Nov. 20, 1945 |
| 2,451,619 | Hengsterbeck et al. | Oct. 19, 1948 |
| 2,490,993 | Borcherding | Dec. 13, 1949 |